(12) United States Patent
Yanagi et al.

(10) Patent No.: US 7,971,849 B2
(45) Date of Patent: Jul. 5, 2011

(54) RECIRCULATING VALVE

(75) Inventors: Mitsunori Yanagi, Oyama (JP); Hiroshi Shimamura, Koga (JP); Yasuhiro Murayama, Takahama (JP); Masashi Suzuki, Obu (JP)

(73) Assignees: Kyosan Denki Co., Ltd., Koga (JP); Denso Corporation, Kariya (JP)

( * ) Notice: Subject to any disclaimer, the term of this patent is extended or adjusted under 35 U.S.C. 154(b) by 981 days.

(21) Appl. No.: 11/476,020

(22) Filed: Jun. 28, 2006

(65) Prior Publication Data

US 2007/0062494 A1   Mar. 22, 2007

(30) Foreign Application Priority Data

Jul. 6, 2005   (JP) .................................. 2005-197653

(51) Int. Cl.
 *F16K 31/00*   (2006.01)
(52) U.S. Cl. .......... 251/11; 251/149; 123/464; 123/514; 123/557
(58) Field of Classification Search .................. 210/136, 210/149, 249, 321.75; 251/11; 123/254, 123/464, 510, 511, 514, 557
See application file for complete search history.

(56) References Cited

U.S. PATENT DOCUMENTS

| 2,271,850 | A | * | 2/1942 | Zinkil .......................... 236/80 R |
| 2,599,699 | A |   | 6/1952 | Dilworth et al. |
| 4,187,813 | A | * | 2/1980 | Stumpp ......................... 123/510 |
| 4,456,216 | A | * | 6/1984 | Boruta ............................ 251/11 |
| 4,457,327 | A | * | 7/1984 | Pepper ............................ 137/67 |
| 4,618,417 | A |   | 10/1986 | Yamanouchi et al. |
| 5,887,573 | A | * | 3/1999 | Janik et al. ..................... 123/514 |
| 5,988,514 | A | * | 11/1999 | Huang ........................ 236/12.14 |
| 6,007,711 | A |   | 12/1999 | Atwood |
| 6,289,879 | B1 | * | 9/2001 | Clausen et al. ................ 123/516 |

FOREIGN PATENT DOCUMENTS

| DE | 35 03 728 A1 | 8/1985 |
| DE | 34 27 396 A1 | 1/1986 |
| DE | 37 26 649 A1 | 3/1988 |
| DE | 44 35 626 A1 | 4/1996 |
| EP | 0 878 620 A2 | 11/1998 |
| EP | 1 270 925 A2 | 1/2003 |
| GB | 574 614 | 1/1946 |
| GB | 2 202 903 A | 10/1988 |
| JP | U-3-65858 | 6/1991 |
| JP | B2-05-079823 | 11/1993 |
| JP | A-2002-256995 | 9/2002 |
| JP | A-2004-500505 | 1/2004 |
| JP | A 2004-257314 | 9/2004 |
| WO | WO 01/38718 A1 | 5/2001 |
| WO | WO03078821 | * 9/2003 |

* cited by examiner

*Primary Examiner* — John K Fristoe, Jr.
(74) *Attorney, Agent, or Firm* — Oliff & Berridge, PLC

(57) ABSTRACT

A recirculating valve according to the present invention comprises a fuel supplying passage in fluid communication with a fuel tank and an engine, a return passage in fluid communication with the engine and the fuel tank, a communication passage in fluid communication with the fuel supplying passage and the return passage. A temperature sensitive displacement portion that is provided in the fuel supplying passage and displaces in accordance with the fuel temperature. An on-off valve closes the communication passage when the fuel temperature in the fuel supplying passage is above a first prescribed temperature, and opens the communication passage when the fuel temperature in the fuel supplying passage is below a second prescribed temperature, in accordance with a displacement of the temperature sensitive displacement portion.

15 Claims, 4 Drawing Sheets

AT THE TIME OF
LOW TEMPERATURE

AT THE TIME OF LOW TEMPERATURE

AT THE TIME OF LOW TEMPERATURE

AT THE TIME OF
HIGH TEMPERATURE

RECIRCULATING VALVE

INCORPORATION BY REFERENCE

The disclosure of Japanese Patent Applications No. 2005-197653 filed on Jul. 6, 2005 including the specification, drawings and abstract is incorporated herein by reference in its entirety.

BACKGROUND OF THE INVENTION

1. Field of the Invention

The present invention relates to a recirculating valve returns surplus fuel supplied to an engine of, for example, an automobile, etc, to a fuel supplying passage that communicates a fuel tank and the engine.

2. Description of the Related Art

A recirculating valve of an automobile fuel system according to the related art, is shown in FIG. 5. Generally, more than a required quantity of fuel is supplied from a fuel tank 3 to an engine 2 through a fuel supplying passage 5, and the surplus fuel is returned to the fuel tank 3 from a return passage 6. A recirculating valve 1 is provided between the engine 2 and the fuel tank 3, as shown in FIG. 5.

The recirculating valve 1 comprises the fuel supplying passage 5, which communicates the fuel tank 3 and a fuel filter 4. Fuel from the fuel tank 3 is sent through the recirculating valve 1 to the engine 2 through the fuel filter 4 as shown by arrow (1). The return passage 6 for returning the surplus fuel from the engine 2 return to the fuel tank 3. A communication passage 7 is provided between the fuel supplying passage 5 and the return passage 6. An annular space 8 is formed at a confluence portion of the return passage 6 and the communication passage 7.

In the annular space 8, a return side nozzle 8a and a communication passage side nozzle 8b are provided so as to be opposed to each other. A bimetallic disk 10 is arranged between the return side nozzle 8a and the communication passage side nozzle 8b and is held in place by a plurality of holding pieces 9 provided along its circumference. The bimetallic disk 10 has a curved shape and curves upward as shown in the figure when the temperature of the fuel is below a prescribed temperature, to close the return side nozzle 8a and at the same time open the communication passage side nozzle 8b. However, when the fuel temperature exceeds the prescribed temperature, the bimetallic disk 10 curves downward, in the opposite direction, and opens the return side nozzle 8a and at the same time closes the communication passage side nozzle 8b.

When the fuel temperature is below the prescribed temperature, surplus fuel from the engine 2 enters the annular space 8 from the direction shown by arrow (2) and flows through the communication passage side nozzle 8b and the communication passage 7 in the direction of arrows (3) and (4) to the fuel supplying passage 5. Mixing the surplus fuel with fuel to be sent to the engine 2 helps to raise the temperature of the fuel. Therefore, a warm-up operation of the engine 2 is excellently performed.

When the warm-up operation of the engine 2 is completed and the engine 2 is warmed-up, the temperature of the surplus fuel returned to the fuel tank 3 is increased. When the temperature exceeds the prescribed temperature, the bimetallic disk 10 of the annular space 8 curves downward. Thus, opening the return side nozzle 8a and at simultaneously closing the communication passage side nozzle 8b. Therefore, as shown by arrows (5) and (6), the surplus fuel is returned to the fuel tank 3 through the return side nozzle 8a and the return passage 6. As a result, heated fuel is not sent to the engine 2, and therefore an excessive temperature increase of the engine 2 can be prevented (see German patent No. 3427396).

Thus, in the recirculating valve according to the related art, when the temperature of the fuel exceeds the prescribed temperature, all of the surplus fuel is returned to the fuel tank through the return passage 6. Therefore, immediately after changeover operation of the valve, the fuel from the fuel tank 3 is supplied directly to the engine 2 through the fuel filter 4, without being heated by mixing with the surplus fuel.

Meanwhile, in regards to the diesel oil used as the fuel of the engine 2, it is known that when the outside temperature is below approximately −5° C., wax in the diesel oil may solidify. Therefore, when the above-described conventional recirculating valve 1 is used in a cold location where the outside temperature is below approximately −5° C., a problem as will be described hereafter arises. When the temperature of the fuel exceeds the prescribed temperature, all of the surplus fuel is returned to the fuel tank 3 through the return passage 6. However, for a brief period after changeover operation of the valve, any wax that may have solidified in fuel that had been maintained at a temperature of below approximately −5° C., also flows to the fuel filter 4 through the fuel supplying passage 5. In this case, the wax adheres to the surface of the fuel filter 4, which may clog the fuel filter 4.

SUMMARY OF THE INVENTION

A recirculating valve according to one aspect of the present invention comprises a fuel supplying passage in fluid communication with a fuel tank and an engine; a return passage in fluid communication with the engine and the fuel tank; and a communication passage in fluid communication with the fuel supplying passage and the return passage. A temperature sensitive displacement portion is provided in the fuel supplying passage and displaces in accordance with the fuel temperature. An on-off valve closes the communication passage when the fuel temperature in the fuel supplying passage is above a first prescribed temperature, and opens the communication passage when the fuel temperature in the fuel supplying passage is below a second prescribed temperature, in accordance with a displacement of the temperature sensitive displacement portion.

In addition, the recirculating valve according to another aspect of the present invention comprises a fuel supplying passage in fluid communication with a fuel tank and an engine; a return passage in fluid communication with the engine and the fuel tank; and a communication passage in fluid communication with the fuel supplying passage and the return passage. A temperature sensitive displacement portion is provided in the fuel supplying passage and displaces in accordance with the fuel temperature. An on-off valve closes the communication passage when the fuel temperature in the fuel supplying passage is above a first prescribed temperature, and opens the communication passage when the fuel temperature in the fuel supplying passage is below a second prescribed temperature, in accordance with a displacement of the temperature sensitive displacement portion.

With a structure thus described, even in locations where the outside temperature may fall to below approximately −5° C., when the temperature of the fuel sent from the fuel tank is a prescribed value, for example, below approximately 20° C., a portion of the surplus fuel is always mixed and sent to the fuel filter. Thus, the wax has not solidified in the fuel supplied to the fuel filter.

If the fuel temperature in the fuel supplying passage is above prescribed temperature, the communication passage is closed and when the fuel temperature is below the prescribed temperature, the communication passage is opened. Thus, supplying a portion of the surplus fuel flowing in the return passage to the engine together with the fuel from the fuel tank through the fuel filter. This facilitates an excellent warm-up operation of the engine even in locations where the outside temperature may fall to below approximately −5°, and minimizes the solidification of the wax in the fuel filter. Therefore, the clogging of the fuel filter by wax is reduced. As a result, reliability of the fuel filter and the engine are improved.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE PREFERRED EMBODIMENTS

In the following description, the present invention will be described in more detail in terms of exemplary embodiments.

Figure 1:
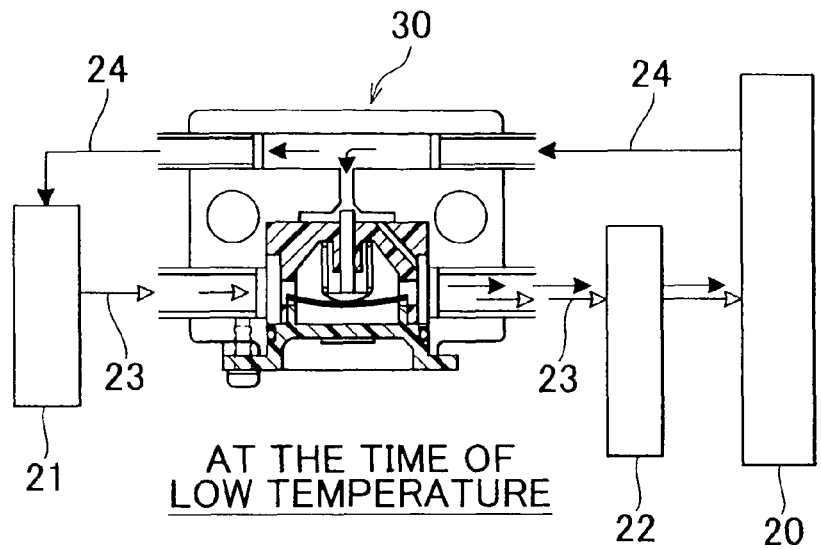
FIG. 1 is a schematic view of a fuel supplying system incorporating a recirculating valve of the present invention.
Figure 2:
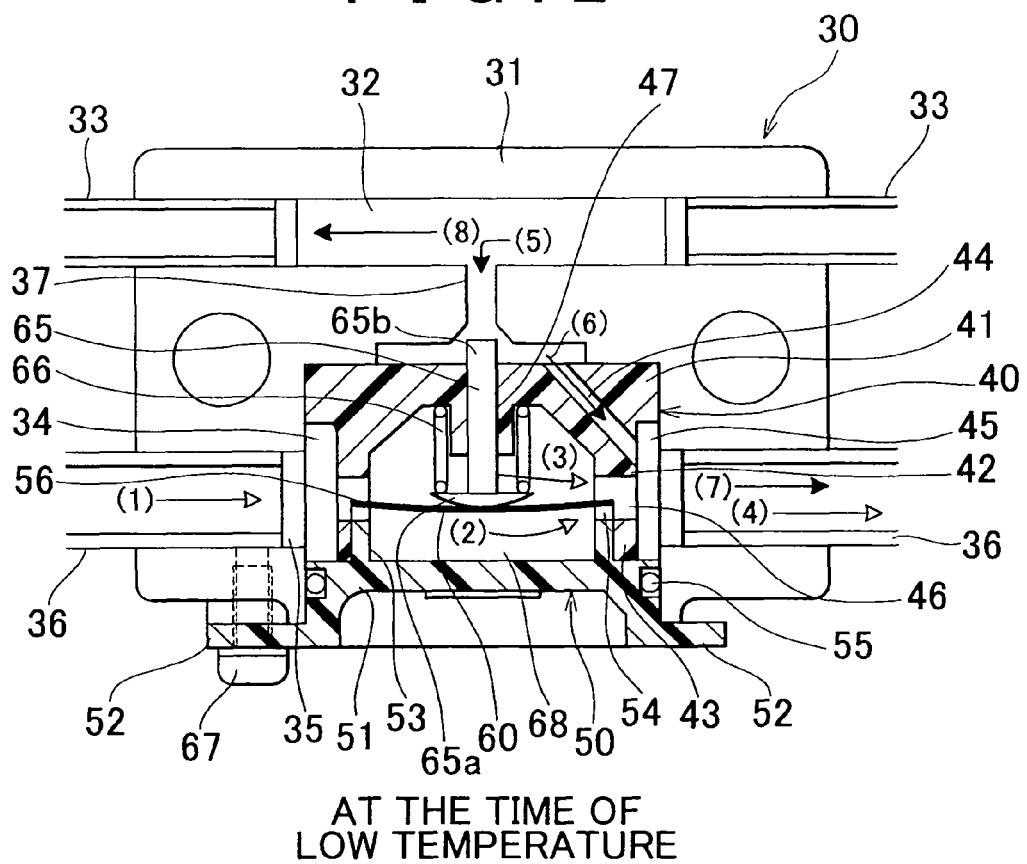
FIG. 2 is an enlarged sectional view of the recirculating valve of the present invention when a fuel temperature is low.
Figure 3:
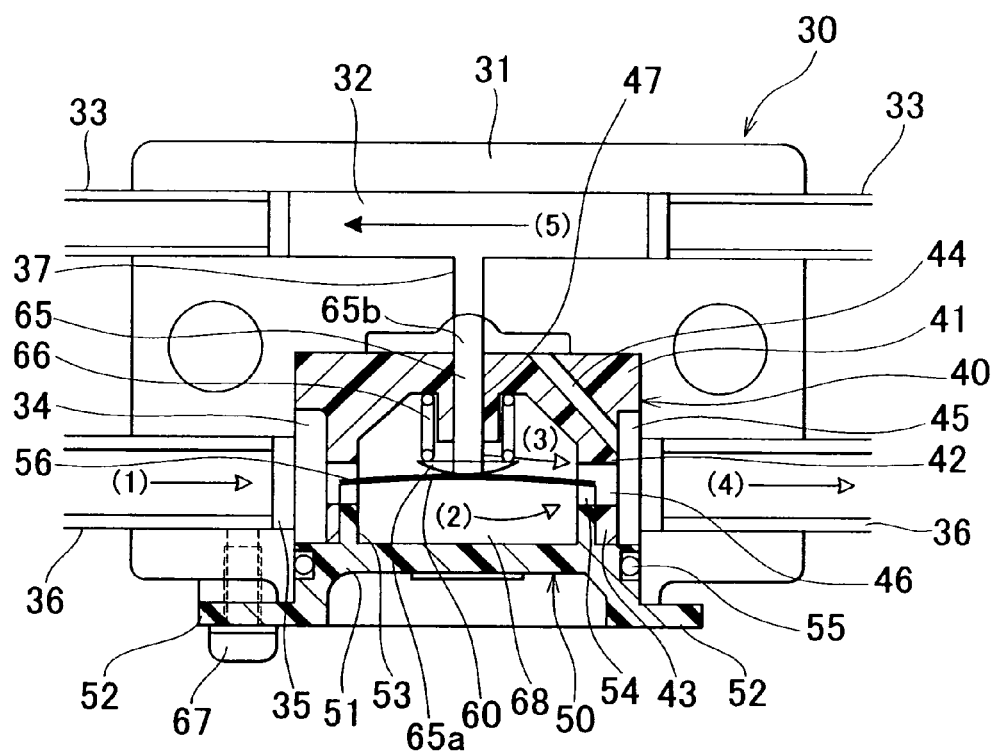
FIG. 3 is an enlarged sectional view of the recirculating valve of the present invention when the fuel temperature is high.

FIG. 1 shows a schematic view of a fuel supplying system incorporating a recirculating valve according to the invention. FIG. 2 shows an enlarged sectional view of the recirculating valve, indicating the fuel flow when the fuel temperature is low. FIG. 3 shows an enlarged sectional view of the recirculating valve, indicating fuel flow when the fuel temperature is high. The recirculating valve of the present invention may be used in any type of fuel system. However, the following describes the recirculating valve used in the context of an automobile fuel system.

Generally, an excess of fuel is supplied to an engine 20 by a pump not shown through a fuel supplying passage 23 and a fuel filter 22. The surplus fuel is returned to the fuel tank 21 from a return passage 24. A recirculating valve 30 is arranged between the engine 20 and the fuel tank 3 as shown in FIG. 1.

As shown in FIG. 2 and FIG. 3, the recirculating valve 30 is composed of a valve main body 31, a spacer member 40, a sheet member 50, a bimetal 60, and an on-off valve 65, etc. The valve main body 31 is an aluminum member forming a contour of the recirculating valve 30, and a return passage portion 32 is formed in an upper part thereof. Further, a pipe member 33 is press-fitted on both sides of the valve main body 31, and a part of the return passage 24 is formed by the return passage portion 32 and the pipe member 33.

An annular groove 34 with an open is formed in a center part of the valve main body 31. A fuel supplying passage portion 35 in a radial direction and parallel to the return passage portion 32 is formed in the annular groove 34, and a pipe member 36 is press-fitted on both sides thereof, to form a part of the fuel supplying passage 23 by the fuel supplying passage portion 35 and the pipe member 36. A communication passage 37 having a small diameter allowing introduction of a part of the surplus fuel into the annular groove 34 is provided between the annular groove 34 and the return passage portion 32.

The spacer member 40 may be an aluminum cylindrical member with an open bottom, having a bottom portion 41, a cylindrical portion 42, and a cylindrical tip portion 43. The bottom portion 41 has an outer diameter slightly smaller than the inner diameter of the annular groove 34, and the cylindrical portion 42 has an outer diameter smaller than the outer diameter of the bottom portion 41. The cylindrical tip portion 43 is provided so as to be extended below the cylindrical portion 42 in the figure and has an outer diameter that is the same as the outer diameter of the cylindrical portion 42 and an inner diameter that is larger than the inner diameter of the cylindrical portion 42.

In the spacer member 40, as shown in the figure, a communication passage 44 having a small diameter for returning the surplus fuel to the fuel supplying passage portion 35 is provided over the range from an upper surface of the bottom portion 41 to a hollow section 45 of an outer peripheral surface of the cylindrical portion 42. Further, three laterally long holes 46 for sending the fuel of the fuel tank 21 to the engine 20 are provided on the same circumference over the range from the cylindrical portion 42 to the cylindrical tip portion 43. Moreover, a valve hole 47 penetrating in a vertical direction, through which an on-off valve 65 is inserted, as will be described later, is provided in the center of the bottom portion 41.

The sheet member 50 may be an approximately cylindrical aluminum member with an open upper part having a cylindrical portion 51, a flange 52, and an annular projection 53. The outer diameter of the cylindrical portion 51 is slightly smaller than the inner diameter of the annular groove 34 and is the same as the outer diameter of the bottom portion 41 of the spacer member 40. The flange 52 protrudes horizontally from a lower end portion of the cylindrical portion 51. The annular projection 53 is set perpendicular to the upper surface of the cylindrical portion 51, and has an outer diameter that is slightly smaller than the inner diameter of the cylindrical tip portion 43 of the spacer member 40.

Three laterally long recess portions 54 are formed on the same circumference, on the annular projection 53 of the sheet member 50. By press-fitting the cylindrical tip portion 43 of the spacer member 40 into the recess portion 54 on the outer periphery of the annular projection 53, the three recess portions 54 and three holes 46 of the spacer member 40 are made to be coincident, and a flow inlet/outlet port of the fuel is formed. Also, an O-ring 55 for fuel sealing is arranged on the outer periphery of the cylindrical portion 51.

The bimetal disk 60 is a temperature sensitive displacement means that deforms by temperature, having the property of curving upward by approximately 0.5 mm as shown in FIG. 3 when the temperature of the fuel is above 30° C., for example, while curving downward by approximately 0.5 mm as show in FIG. 2 when the temperature of the fuel is below 20° C., for example. Specifically, the bimetal disk 60 in this case has two displacement temperatures of 20° C. and 30° C. In other words, the displacement temperature of the bimetal disk 60 has a hysteresis of 10° C. between a case that the fuel temperature is increased and a case that the fuel temperature is decreased. Here, 30° C. corresponds to a first prescribed temperature of the present invention, and 20° C. corresponds to a second prescribed temperature. When the cylindrical tip portion 43 of the spacer member 40 is press-fitted on the outer periphery of the annular projection 53 of the sheet member 50, the bimetal disk 60 is sandwiched between the tip portion of the annular projection 53 of the sheet member 50, and a step portion 56 formed between the inner peripheral surface of the cylindrical tip portion 43 of the spacer member 40 and the inner peripheral surface of the cylindrical portion 42. Although the displacement temperature of the bimetal disk 60 has the hysteresis, it is not required to have the hysteresis. The displacement temperature can be suitably changed as needed within a range of exhibiting an action effect of the present invention.

When the bimetal disk 60 is sandwiched by the spacer member 40 and the sheet member 50, a valve head 65a of a pin-shaped on-off valve 65 is abutted on the bimetal disk 60 and a valve stem 65b is inserted into a valve hole 47 of the spacer member 40. A spring 66 for pressing the on-off valve 65 in a direction of the bimetal disk 60 is interposed between the spacer member 40 and the valve head 65a.

The recirculating valve 30 is assembled as follows. First, the pipe member 33 is press-fitted to the return passage portion 32 of the valve main body 31, and the pipe member 36 is press-fitted to the fuel supplying passage portion 35.

Next, the spacer member 40 and the sheet member 50 are integrally assembled in the following manner. First, the spacer member 40 is placed, with an open end set upward, and the spring 66 is placed around the valve hole 47. Next, the valve stem 65b of the on-off valve 65 is inserted, so that the spring 66 is interposed between the bottom portion 41 and the valve head 65a. Thereafter, the bimetal disk 60 is placed on the step portion 56 formed between the inner peripheral surface of the cylindrical tip portion 43 and the inner peripheral surface of the cylindrical portion 42. Note that when the bimetal disk 60 is placed, the bimetal disk 60 may be curved in any direction.

Thereafter, the sheet member 50 is press-fitted to the spacer member 40, so that the outer peripheral surface of the annular projection 53 of the sheet member 50 is abutted on the inner peripheral surface of the cylindrical tip portion 43, and the bimetal disk 60 is sandwiched by the step portion 56 and the tip portion of the annular projection 53. After integrally forming the spacer member 40 and the sheet member 50, an inside space 68 is formed. The inside space 68 is communicated with the hollow section 45 on the outer periphery through the hole 46.

Next, the space member 40 and the sheet member 50 thus integrally formed are inserted into the annular groove 34 of the valve main body 31, and the flange 52 is fastened and fixed by two screws 67. In this case, since the O-ring is attached to the outer periphery of the cylindrical portion 51, a leakage of the fuel can be prevented.

The flow of fuel in the assembled recirculation valve 30 will be next explained. When the temperature of the fuel from the fuel tank 21 is increased to a temperature above 30° C., the bimetal disk 60 curves upward as shown in FIG. 3 (note that displacement does not occur when the bimetal disk 60 is in a curved state during assembly), and the tip of the valve stem 65b of the on-off valve 65 closes the communication passage 37. Then, the fuel from the fuel tank 21 passes the routes shown by arrow (1) and shown by arrows (2), (3) in the inside space 69, and shown by arrow (4), as shown in FIG. 3, and is supplied to the engine 20 through the fuel filter 22. The total amount of the surplus fuel from the engine 20 returns to the fuel tank 21, as shown by arrow (5), without returning to the inside space 68 through the communication passage 37.

When the temperature of the fuel in the fuel tank 21 is decreased from above 30° C. to below 20° C. due to the outside temperature, the bimetal disk 60 curves downward as shown in FIG. 2 (note that displacement does not occur when the bimetal disk 60 is in a curved state during assembly), and the on-off valve 65 moves downward by its own weight and an action of the spring 66, and the tip of the valve stem 65b opens the communication passage 37.

The fuel from the fuel tank 21 flows along the routes shown by arrow (1), by arrows (2), (3) in the inside space 68, and shown by arrow (4), as shown in FIG. 2, and is supplied to the engine 20 through the fuel filter 22. The surplus fuel from the engine 20 is returned to the fuel tank 21 through the return passage portion 32s as shown by arrow (8). However, since the on-open valve 65 opens the communication passage 37, a portion of the surplus fuel flowing through the return passage portion 32 flows to the pipe member 36 (shown by arrow (7)) through the communication passage 37 (shown by arrow (5)), the communication passage 44 (shown by arrow (6)) and the hollow section 45, and is mixed with the fuel flowing through the inside space 68. As a result, heated fuel is sent to the engine 20 through the fuel filter 22, and therefore the warm-up operation of the engine 20 is excellently performed. In addition, for example even when the outside temperature falls to below approximately −5° C. in a place such as a cold environment, the wax in the fuel does not solidify because the temperature of the fuel sent to the fuel filter 22 is above the temperature at which the wax begins to solidify. Therefore, the clogging of the fuel filter 22 due to depositing of the wax is prevented.

Figure 4:
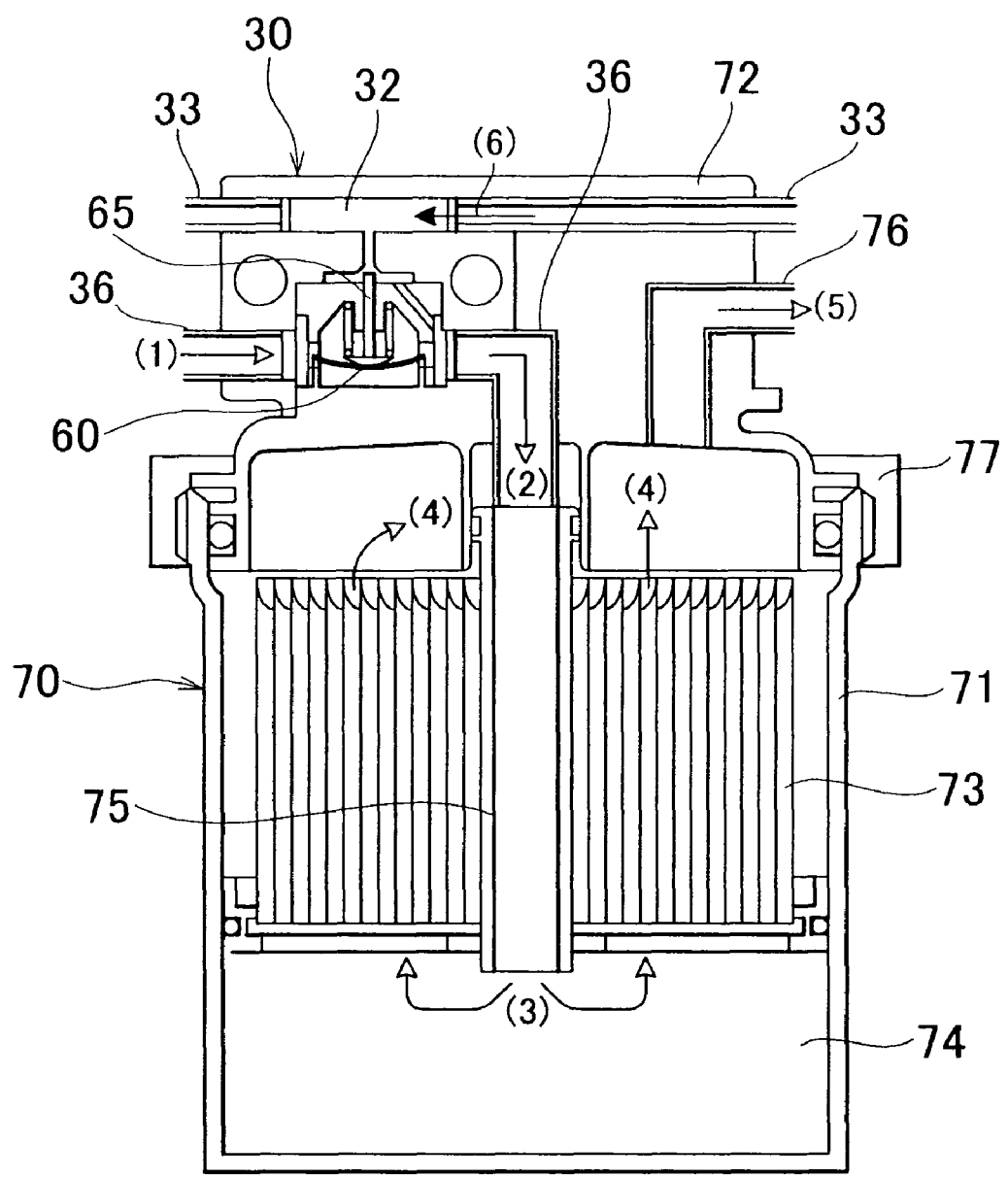
FIG. 4 is an enlarged sectional view of other recirculating valve of the present invention when the fuel temperature is low.
Figure 5:
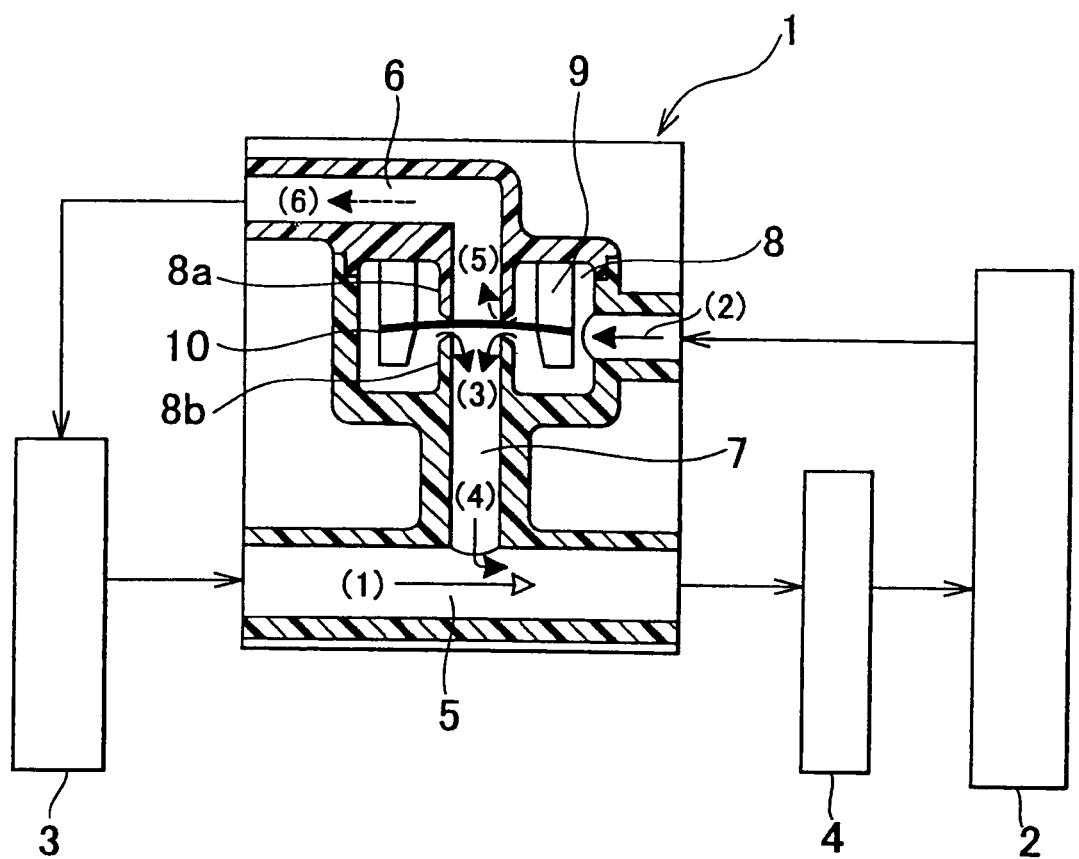
FIG. 5 is a schematic view of a fuel supplying system incorporating a recirculating valve according to the related art.

FIG. 4 shows a modified example of the recirculating valve when the fuel temperature is low. In this modified example, the recirculating valve 30 and the fuel filter 70 are integrally formed. Note that the structure of the recirculating valve 30 is the same as those of FIG. 1 to FIG. 3, and thus an explanation is omitted.

The fuel filter 70 described here is substantially same as the aforementioned fuel filter 22. The fuel filter 70 is composed of a case portion 71 and a lid portion 72. The case portion 71 is a cylindrical member with an open upper part, and an element 73 is attached to an inside upper part, and a lower space 74 is formed in a lower part of the element 73. Also, a pipe member 75 is hung in the center of the element 73, and the recirculating valve 30 and the lower space 74 are communicated. The lower space 74 is a space for separately storing water, etc, in the fuel, and a water level sensor and a drain cock, not shown are provided as needed.

A lid portion 72 is a member for closing an upper opening part thereof after containing the element 73 in the case portion 71, and is integrally fixed in the case portion 71 by a fastening member after being fitted thereinto. As described above, the recirculating valve 30 shown in FIG. 1 to FIG. 3 is integrally formed in the lid portion 72. The difference from the recirculating valve shown in FIG. 1 to FIG. 3 is the point that the pipe member 36 for communicating with the fuel filter 70 is folded back to directly connected to the pipe member 75.

The flow of the fuel after assembly will be next explained. By the change of the outside temperature, when the temperature of the fuel in the fuel tank 21 is decreased from above 30° C. to below 20° C., the bimetal disk 60 curves downward as shown in the figure, and the on-off valve 65 moves by its own weight and the action of the spring, and the tip of the valve stem 65b opens the communication passage 37.

Then, the fuel from the fuel tank 21 passes the route shown by arrow (1), the recirculating valve 30, and the route shown by arrow (2), and is flown to the lower space 74 of the lower part of the case portion 71 through the pipe member 75. The fuel flown to the lower space 74 is turned the other way around as shown by arrow (3) in the lower space 74, so as to be directed upward. However, water, etc in the fuel is separated at that time. The fuel, from which the water, etc, is separated, passes in the element 73 from the lower part to the upper part, to remove an impurity such as refuse, and as shown by arrows (4) and (5), is flown from a flow-out pipe 76 and sent to the engine 20.

As explained in FIG. 2, a part of the surplus fuel from the engine 20 is flown to the pipe member 36 through the communication passage 37, the communication passage 44 and the hollow section 45. As a result, the heated fuel is sent to the engine 20 through the fuel filter 70. Therefore, the warm-up operation of the engine 20 is excellently performed. Further, for example, even when the outside temperature in the place such as a cold environment is below approximately −5° C., the wax in the fuel does not solidify, because the temperature of the fuel sent to the fuel filter 22 is above the temperature at which the wax begins to solidify. Therefore, the clogging of the filter 22 due to depositing of the wax is prevented.

In addition, when the temperature of the fuel in the fuel tank 21 is increased, and the temperature reaches above 30° C., the bimetal disk 60 is curved upward as shown in FIG. 3, and the tip of the valve stem 65b of the on-off valve 65 closes the communication passage 37. Then, as shown by arrow (6), the total amount of the surplus fuel from the engine 20 is returned to the fuel tank 21, without recirculating in the inside space 68 through the communication passage 37.

The structure of the present invention is not limited to the structure of the aforementioned embodiments, and a design can be suitably modified in a scope not departed from the gist of the present invention.

What is claimed is:

1. A recirculating valve, comprising:
    a fuel supplying passage in fluid communication with a fuel tank and an engine;
    a return passage in fluid communication with the engine and the fuel tank;
    a communication passage in fluid communication with the fuel supplying passage and the return passage;
    a temperature sensitive displacement portion that is provided in the fuel supplying passage; and
    an on-off valve that closes the communication passage when a fuel temperature in the fuel supplying passage is above a first prescribed temperature, and opens the communication passage when the fuel temperature in the fuel supplying passage is below a second prescribed temperature, in accordance with a displacement of the temperature sensitive displacement portion,
    wherein the fuel supplying passage and the communication passage are connected at a downstream side of the temperature sensitive displacement portion such that fuel supplied into the fuel supplying passage through the communication passage is supplied to the engine without contacting the temperature sensitive displacement portion.

2. The recirculating valve according to claim 1, wherein the on-off valve has a valve shaft, and opening and closing of the communication passage is performed in accordance with a movement of the valve shaft.

3. The recirculating valve according to claim 1, wherein the first prescribed temperature is equal to the second prescribed temperature.

4. The recirculating valve according to claim 1, wherein the on-off valve is formed in a pin shape.

5. The recirculating valve according to claim 1, wherein the recirculating valve is formed integrally with a fuel filter.

6. The recirculating valve according to claim 1, wherein, when the fuel temperature in the fuel supplying passage is below the second prescribed temperature, the on-off valve opens the communication passage, and a portion of surplus fuel flowing in the return passage is thereby supplied to the engine together with the fuel from the fuel tank through a fuel filter.

7. The recirculating valve according to claim 6, wherein the on-off valve has a valve shaft, and opening and closing of the communication passage is performed in accordance with a movement of the valve shaft.

8. The recirculating valve according to claim 6, wherein the first prescribed temperature is equal to the second prescribed temperature.

9. The recirculating valve according to claim 6, wherein the on-off valve is formed into a pin shape.

10. The recirculating valve according to claim 6, wherein the recirculating valve is formed integrally with the fuel filter.

11. The recirculating valve according to claim 1, wherein the temperature sensitive displacement portion is a bimetallic member.

12. The recirculating valve according to claim 11, wherein the on-off valve has a valve shaft and opening and closing of the communication passage is performed in accordance with a movement of the valve shaft.

13. The recirculating valve according to claim 11, wherein the first prescribed temperature is equal to the second prescribed temperature.

14. The recirculating valve according to claim 11, wherein the on-off valve is formed in a pin shape.

15. The recirculating valve according to claim 11, wherein the recirculating valve is formed integrally with a fuel filter.

* * * * *